Figure 1:
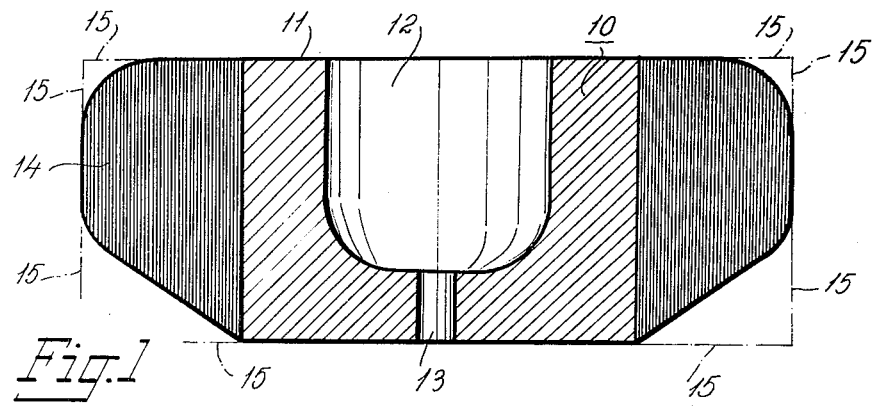

United States Patent

Strandell

[15] 3,691,816

[45] Sept. 19, 1972

[54] MOULDS

[72] Inventor: Per-Olof Strandell, Bockstigen 3, Taby, Sweden

[22] Filed: June 19, 1970

[21] Appl. No.: 47,683

[30] Foreign Application Priority Data

June 25, 1969 Sweden.....................9024/69

[52] U.S. Cl................................................72/467
[51] Int. Cl...............................................B21c 3/00
[58] Field of Search....72/467; 18/34 R; 29/446, 452; 76/107; 52/224

[56] References Cited

UNITED STATES PATENTS 3,550,213   12/1970   Ormsby et al..............18/34 R
3,461,506   8/1969   Rice et al....................18/34 R Primary Examiner—Milton S. Mehr
Attorney—Stevens, Davis, Miller & Mosher

[57] ABSTRACT

A reinforced mould, including a mould body having a mould cavity in at least one end surface thereof, the mould body has arranged along at least part of its axial length a pre-tensioned reinforcing means in the form of at least one winding of thin metallic strip material, wherein the width of the wound turns of reinforcing winding, as seen in axial section, decreases radially outwardly from the periphery of the mould body to provide a pre-tensioning force which varies along the mould body proportionally to the forces exerted therein when the mould is used.

3 Claims, 3 Drawing Figures

PATENTED SEP 19 1972 3,691,816

MOULDS

The present invention relates to a mould of the type which includes a mould body having a mould cavity in at least one end surface thereof and being encircled along at least part of its axial length by a pretensioned reinforcement comprising at least one winding of metallic, strip material which has a thickness of at most of a few tenths of a millimeter, and the whole of the bottom face of each turn of a winding being in abutment with the upper face of the preceding turn of said winding.

When producing articles by forging or by powder compacting processes in moulds of the aforementioned type, more fully described in my U.S. Pat. No. 3,608,351 issued Sept. 28, 1971, the stresses appearing in the moulds normally vary greatly along the length of the mould body. Thus, when using a mould having a cup shaped, blind mould cavity the tangential tension forces appear in relation to the diameter or width of the cavity, so that the forces acting at the bottom of the cavity have a small magnitude when compared with the tangential tension forces occuring at locations remote from the bottom. This can give rise to troublesome shear forces in the mould body adjacent the bottom of the cavity, especially in the case of moulds subjected to heavy loads. When using moulds of the type which have a cavity passing axially through it in which, for example, metal powder or the like is compacted by means of two pistons forced in to the mould cavity from their respective ends of the mould body, the tangential tensile forces increase from zero at the ends of the body to maximum at a region remote from the ends. Because of this the mould cavity is likely to be widened at the region subjected to the maximum forces, thus rendering it difficult to eject the compacted powdered articles and possibly resulting in damage thereto.

These disadvantages can to a certain extent be eliminated by employing several windings and using windings having more turns and/or affording a higher degree of pre-tension in regions of the mould body which are subjected to higher stresses than other regions thereof, as described in said U.S. Pat. No. 3,608,351, although the occurrence of abrupt variations in pre-tensioning forces at certain regions along the body can never by avoided by means of these arrangements and hence in certain cases the mentioned inconveniences still remain to a troublesome degree.

In order to remove these inconveniences more fully it is suggested in accordance with the invention that with a mould of the type described above, the width of the winding or the width of at least some of the windings — when viewed in axial section — is made to decrease radially outwards from the periphery of the body in a manner whereby the pre-tensioning force applied to the body through the winding or windings varies along the length of the body, substantially in proportion to the radial and peripheral forces acting thereon when the mould is being used.

A mould according to the invention can of course be produced by wrapping around the body at least one strip or band whose width progressively decreases in accordance with a specific pattern, whereby the desired variation in pre-tensioning is obtained along the length of the mould body. This method of obtaining the variation in pre-tension is, however, both impractical and expensive. A simpler and more economic method — despite a certain loss of material — is to reinforce the mould in accordance with the invention, by mechanically machining the winding or at least some of the windings, e.g. on a lathe or by grinding, in a manner whereby the width of the winding, when viewed in axial section, decreases radially outwards from the periphery of the mould body and the pre-tensioning forces applied to the body by the winding or windings are caused to vary along the length of the body, substantially proportionally to the forces created thereon when the mould is being used.

Figure 2:
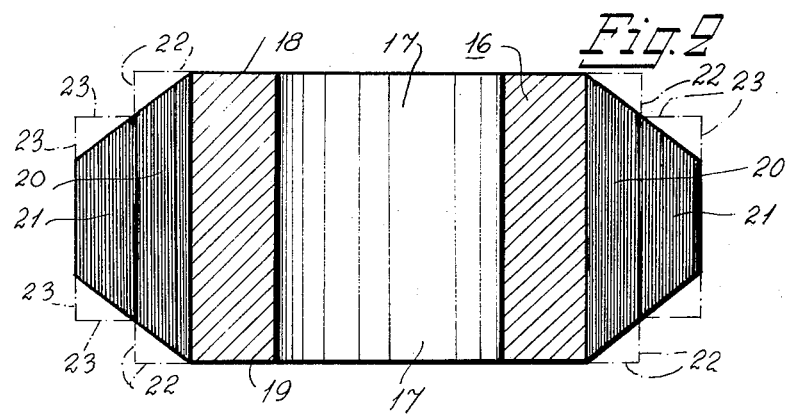
Figure 3:
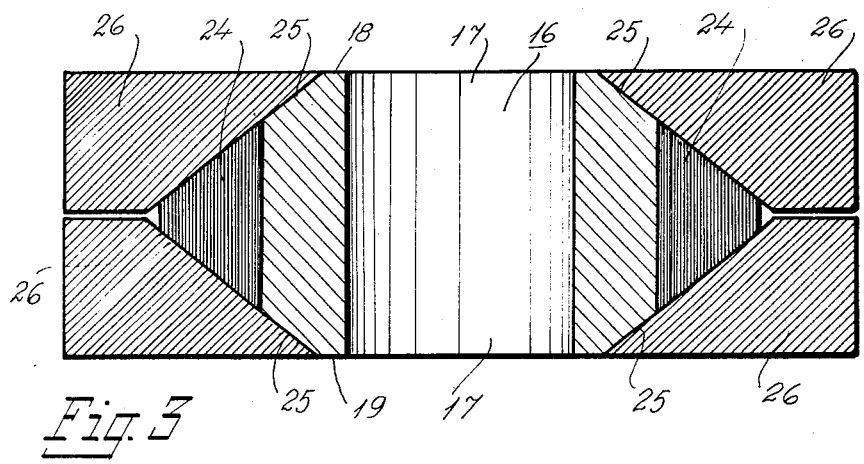

The invention will now be described with reference to a number of embodiments shown diagrammatically in the accompanying drawing, in which:

FIG. 1 is an axial sectional view of a first mould constructed according to the invention; and, FIGS. 2 and 3 illustrate in axial section a second and a third mould according to the invention.

FIG. 1 illustrates diagrammatically a mould body 10 having at its one end surface 11 a blind mould cavity 12. Extending axially through the body 10 from the bottom of the cavity is a bore 13 adapted to accomodate an ejector pin. Arranged around the body 10 is a reinforcement in the form of a winding 14 of thin, metallic strip material, the thickness of which should preferably not exceed 0.4 mm and is preferably less than 0.2 mm. The thickness of the strip is preferably only few hundreths of a millimeter as described in said U.S. Pat. No. 3,608,351. Holes and other arrangements located on the mould to facilitate its positioning in a moulding apparatus, such as a foundry press, have been omitted for the sake of clarity. The external configuration of the mould body 10 may be cylindrical or, when considered suitably, may have a cross sectional shape which is other than circular. For example, when the mould cavity has an elongated shape in cross section it may be more appropriate to use a mould body which presents a substantially elliptical shape in cross section, the long axis of the ellipse extending perpendicularly to the longitudinal direction of the cavity when seen in cross section. If the cross-sectional shape of the mould cavity is triangular or polygonal, it may be convenient to slot the mould body axially along at least one of the corners of the cavity to avoid cracks and the like from occuring as a result of excessive tensile forces acting at said corners, the body portions being held together solely by means of the winding 14. The winding 14 can be formed to advantage with strip material of uniform width along the whole of its length, the winding thereby obtaining the contours shown by broken lines 15. The winding can then be machined mechanically, on a lathe or by grinding for example, so that — seen in axial section — the radial thickness varies along the length of the mould body in the desired manner.

In FIGS. 2 and 3 the mould body, here identified by the reference numeral 16, has a cavity 17 passing the mould being mould cavity 17 and encircled by a reinforcement consisting of a thin, metallic strip material. The mould is intended for use in compacting powdered material. When compacting the material, two pistons are forced into the cavity 17 in a conventional manner from their respective ends 18 and 19 of the mould body 16. The pistons and the means for ejecting the compacted powder bodies have not been shown, since they form no part of the invention.

The profile given to the reinforcements shown in FIGS. 2 and 3 is also such that the pre-tensioning forces applied to the body 16 vary along the length of said body essentially proportionally to the forces occuring on the body, when the tool is being used. The embodiment illustrated in FIG. 2 comprises two windings 20 and 21 which, as indicated by the dash lines 22 and 23, have been made by using wider and narrower metal strips, which have uniform width along their lengths, and then machined in accordance with the invention to obtain the desired variation in thickness. The reinforcement shown in FIG. 3 comprises a thin metal strip winding 24. In addition to the winding 24 the mould body 16 in this exemplary embodiment has also been machined in a manner whereby the ends 18 and 19 of the mould body present chamfered surfaces 25 which are in contact with support rings 26 which protect the winding 24 on the mould body and which are adapted to be fixed in a mould holder in a known manner.

The invention is not restricted to the described and illustrated embodiments, but can be varied within the scope of the following claims.

What is claimed is:

1. A mould of the type including a mould body having a mould cavity in at least one end surface thereof and being encircled along at least part of its axial length by a pre-tensioned reinforcement comprising at least one winding of metallic, strip material which has a thickness of at most 0.5 millimeters with the whole of the bottom face of each turn of a winding being in abutment with the upper face of the preceding turn of said winding, and when viewed in axial section the width of windings decreasing radially outwards from the periphery of the mould body in a manner whereby the pre-tensioning force applied to the body through the windings varies along the length of the mould body essentially in proportion to the radial and peripheral forces occuring on the body when the mould is being used.

2. A mould according to claim 1, including protecting support rings about the winding, each ring abutting a respective end of the mould body.

3. A mould according to claim 1, wherein the thickness of the strip material is less than 0.2 mm.

* * * * *